United States Patent
Bose et al.

(10) Patent No.: US 8,798,962 B2
(45) Date of Patent: Aug. 5, 2014

(54) VIRTUALIZED ABSTRACTION WITH BUILT-IN DATA ALIGNMENT AND SIMULTANEOUS EVENT MONITORING IN PERFORMANCE COUNTER BASED APPLICATION CHARACTERIZATION AND TUNING

(75) Inventors: Pradip Bose, Yorktown Heights, NY (US); Alper Buyuktosunoglu, White Plains, NY (US); Canturk Isci, West New York, NJ (US); Jeff Kephart, Cortlandt Manor, NY (US); Xiaoqiao Meng, Yorktown Heights, NY (US); Ruhi Sarikaya, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 13/052,616

(22) Filed: Mar. 21, 2011

(65) Prior Publication Data
US 2012/0245897 A1    Sep. 27, 2012

(51) Int. Cl.
*G06F 11/30* (2006.01)
*G06F 9/455* (2006.01)

(52) U.S. Cl.
USPC .......................................... 702/186; 718/1

(58) Field of Classification Search
USPC ............ 702/186, 182, 188; 718/1, 104; 717/100, 120–121, 127–128, 131; 711/203; 709/224
See application file for complete search history.

(56) References Cited

U.S. PATENT DOCUMENTS

| | | | |
|---|---|---|---|
| 5,857,097 A | 1/1999 | Henzinger et al. | |
| 5,937,437 A | 8/1999 | Roth et al. | |
| 6,374,369 B1 | 4/2002 | O'Donnell | |
| 7,103,877 B1 | 9/2006 | Arnold et al. | |
| 7,225,110 B2 | 5/2007 | Mericas | |
| 7,392,370 B2 | 6/2008 | DeWitt, Jr. et al. | |
| 7,574,587 B2 | 8/2009 | DeWitt, Jr. et al. | |
| 2007/0083643 A1* | 4/2007 | Arndt et al. | 709/224 |
| 2008/0040715 A1 | 2/2008 | Cota-Robles et al. | |
| 2008/0163254 A1 | 7/2008 | Cota-Robles et al. | |
| 2008/0177756 A1 | 7/2008 | Kosche et al. | |
| 2008/0288940 A1 | 11/2008 | Adams et al. | |
| 2008/0301473 A1 | 12/2008 | Perez et al. | |
| 2009/0300166 A1 | 12/2009 | Chen et al. | |
| 2009/0300605 A1 | 12/2009 | Edwards et al. | |

OTHER PUBLICATIONS

Canturk et al., Detecting Recurrent Phase Behavior Under Real-System Variability, IEEE International Symposium on Workload Characterization (IISWC), Oct. 2005.
Mytkowicz et al., Aligning Traces for Performance Evaluation, Next Generation Systems Workshop (NGS), 2006.

(Continued)

*Primary Examiner* — Toan Le
(74) *Attorney, Agent, or Firm* — Ryan, Mason & Lewis, LLP (57) ABSTRACT

Techniques for monitoring a set of one or more event counters of application execution are provided. The techniques include constructing a virtual performance monitoring counter (VPMC) layer as a unified abstraction of a physical performance monitoring counter (PMC) architecture, and incorporating one or more programming interfaces (PIs) in connection with the virtual performance monitoring counter, wherein the one or more programming interfaces facilitate simultaneous access and data monitoring across a set of one or more event counters.

19 Claims, 5 Drawing Sheets

(56) References Cited

OTHER PUBLICATIONS

Mytkowicz et al., Time Interpolation: So Many Metrics, So Few Registers, 40th International Symposium on Microarchitecture (MICRO 2007).

Salapura et al., Next-Generation Performance Counters: Towards Monitoring Over Thousand Concurrent Events, ISPASS 2008, IEEE International Symposium on Performance Analysis of Systems and Software, Apr. 2008.

Khanna et al., Application Performance Management in Virtualized Server Environments, Network Operations and Management Symposium, NOMS 2006. 10th IEEE/IFIP, 373-381.

Jian et al., A Performance Isolation Algorithm for Shared Virtualization Storage System, 2009, IEEE International Conference on Networking, Architecture, and Storage, NAS, 35-42.

Shao et al., PMonitor: A Lightweight Performance Monitor for Virtual Machines, 2009, First International Workshop on Education Technology and Computer Science, 689-693.

* cited by examiner

VIRTUALIZED ABSTRACTION WITH BUILT-IN DATA ALIGNMENT AND SIMULTANEOUS EVENT MONITORING IN PERFORMANCE COUNTER BASED APPLICATION CHARACTERIZATION AND TUNING

FIELD OF THE INVENTION

Embodiments of the invention generally relate to information technology, and, more particularly, to performance monitoring.

BACKGROUND OF THE INVENTION

Current microprocessor generations make extensive use of hardware performance monitoring counters (PMCs) for online adaptations and offline characterizations. Online performance counter monitoring can be used in several adaptive management scenarios to dynamically manipulate power/performance behavior of computing systems, where performance counters help track and predict dynamically-varying application characteristics. Offline performance counter monitoring can be used for application tuning and characterization. Performance characterization enables the identification of representative points within an application to study or simulate. Furthermore, through performance counters, diagnosis of an application as well as the underlying hardware design on which the application is run can be performed. For example, the cause or nature of application performance can be analyzed and can be broken down into several components. For example, instructions completed per cycle (IPC) can be written as a function of several stall events such as branch mispredictions, L1 cache misses, L2 cache misses, ERAT misses, and TLB misses. Such performance-counter-based performance analysis and breakdown is also commonly applied during the final production cycles of microprocessor design.

Due to physical resource limitations, however, performance counter architectures rely on a limited set of physical counter registers into which several events are multiplexed. For example, assume an architecture has eight counters, where several events are mapped onto each counter. Only a selection of these events can be read into each counter, which forms a group. As such, one cannot measure any other event of interest besides the in the chosen group. For example, if one wants to obtain information of another group, the other group has to be measured separately, requiring explicit runtime multiplexing or a separate run of the same application.

Even with offline analysis, where real-time response is not required, this hardware limitation requires multiple sequential runs of the applications. Besides the time overhead, such multiple measurements have an additional challenge. Due to real-system variability, each run exhibits some level time variation compared to the other runs. This variability occurs due to the different locality during different runs, occurrence and intensity of spontaneous system processes, inexact memory access patterns, swaps, different cache, translation look aside buffer, branch history table states, etc. Thus, for the same application runs, it is possible to have instruction completed per cycle (IPC) measurements that are different across multiple performance counter measurements.

SUMMARY OF THE INVENTION

Principles and embodiments of the invention provide techniques for a virtual performance monitoring counter. An exemplary method (which may be computer-implemented) for monitoring a set of one or more event counters of application execution, according to one aspect of the invention, can include steps of constructing a virtual performance monitoring counter (VPMC) layer as a unified abstraction of a physical performance monitoring counter (PMC) architecture, and incorporating one or more programming interfaces (PIs) in connection with the virtual performance monitoring counter, wherein the one or more programming interfaces facilitate simultaneous access and data monitoring across a set of one or more event counters.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include teachings for a virtual performance counter layer. One or more embodiments of the invention include virtualized abstraction with built-in data alignment and simultaneous event monitoring in performance counter based application characterization and tuning. As described herein, a virtual performance monitoring counter (VPMC) layer is constructed as a unified abstraction of the physical performance monitoring counter architecture, further including programming interfaces to the virtual performance monitoring counter suitable for simultaneous access and data monitoring across a set of event counters at the user or software level.

In one or more embodiments of the invention, the virtual performance counter layer is designed such that is decoupled from the limitations of physical counter architectures. Accordingly, the techniques detailed herein include providing a global performance counter configuration and monitoring system that hides hardware limitations, multiplexing and alignment requirements from the end consumers of hardware performance counters.

A VPMC, as described herein, can incorporate multiple mechanisms for the actual multiplexing and alignment constraints. Also, for offline analyses, the VPMC can identify the transformations in the collected performance counter traces, discard non-conforming trace regions and perform piecewise alignment of multiple trace segments to derive the common base performance characteristics of applications across several measurements. For online analyses, the VPMC can employ multiplexing and cross-metric predictions to achieve the view of a larger set of counters.

Further, in one or more embodiments of the invention, the VPMC layer provides a single unified abstraction for monitoring large number of performance events simultaneously. As such, this virtual layer can abstract away hardware counter configurations and mutual execution limitations so that a large number of aligned events can be collected for a given application. Counter alignment can be utilized and multiple performance runs can be consolidated to return a unified set of performance monitoring information.

In addition to providing a large set of performance events for applications running on native systems, one or more embodiments of the invention can also present a set of performance counters to running virtual machines (VMs) in a virtualized environment. Where multiple VMs are consolidated on a single host, a mechanism to expose a set of performance counters to each VM is needed. The VPMC abstraction in one or more embodiments of the invention provides a mechanism to expose virtual performance counters to each VM, while the underlying hypervisor performs the appropriate accounting tasks to attribute the performance events to the running entities.

In one or more embodiments of the invention, the VPMC layer can be considered as a low-level operating system or hypervisor component, similar to a device driver or kernel module. In its privileged state, the VPMC can access and configure hardware PMCs directly. The VPMC can expose, upstream, a generic performance monitoring interface that the user-level applications or virtual machines can access. The access from user space is accomplished by standard interfaces that are well-known (for example, /proc and system calls).

In one or more embodiments of the invention, no additional interface is provided for manipulating and monitoring counters besides VPMC. In such instances, all other applications and VMs gain access through VPMC and thus, per-task accounting can be reliably maintained by VPMC. Moreover, in the virtualization use case, a closed-form access, only via the hypervisor is required to enforce VM isolation.

In one or more embodiments of the invention, the kernel module function can be replaced by firmware function or by a firmware code in a microcontroller. In such an embodiment, either an existing microcontroller is utilized or a dedicated microcontroller for the purpose is deployed. In both cases, the performance counters can be read through specialized interfaces between the microprocessor and the microcontroller. For example, in the case of IBM p-series systems, the microprocessor is accompanied by an off-chip microcontroller referred to as TPMD. This specific microcontroller communicates with the chip over an I2C link. Through the I2C link, the microcontroller can access the chip's on-chip registers with write and read privileges. Starting, for example, with POWER7 systems, to reduce the communication overhead as well as to improve scalability and simplify data acquisition, the design can also incorporate an on-chip communications assist (OCA) unit in the chip. With a similar structure (OCA, I2C, and an off-chip microcontroller), one or more embodiments of the invention can practice the performance counter data collection and processing. The data collection and processing can be implemented completely out-of-band.

Figure 1:
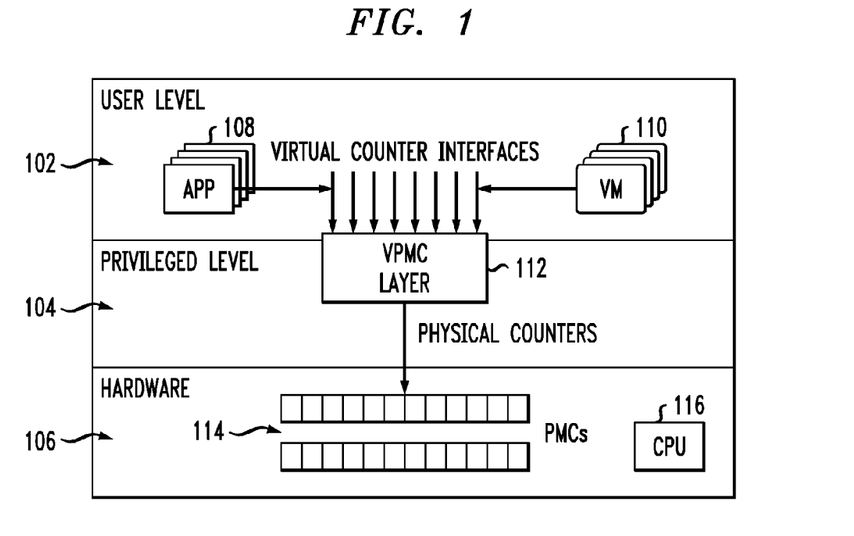
FIG. 1 is a diagram illustrating virtual performance monitoring counter (VPMC) system architecture, according to an embodiment of the invention.

The example overall architectural hierarchy is depicted in FIG. 1. FIG. 1 is a diagram illustrating virtual performance monitoring counter (VPMC) system architecture, according to an embodiment of the invention. By way of illustration, FIG. 1 depicts a user level 102, which includes an application 108 and a VM 110. FIG. 1 also depicts a privileged level 104 that includes a VPMC layer 112 (which can include virtual counter interfaces). Additionally, FIG. 1 depicts a hardware portion 106, which includes performance monitoring (PM) counters 114 (for example, physical counters) and a central processing unit (CPU) 116.

The VPMC can also be designed as an umbrella abstraction layer. Within VPMC, different mechanisms are initiated for different performance monitoring goals. Specifically, as detailed herein, there are two operating modes of VPMC: (i) Online monitoring and (ii) Offline monitoring.

Figure 2:
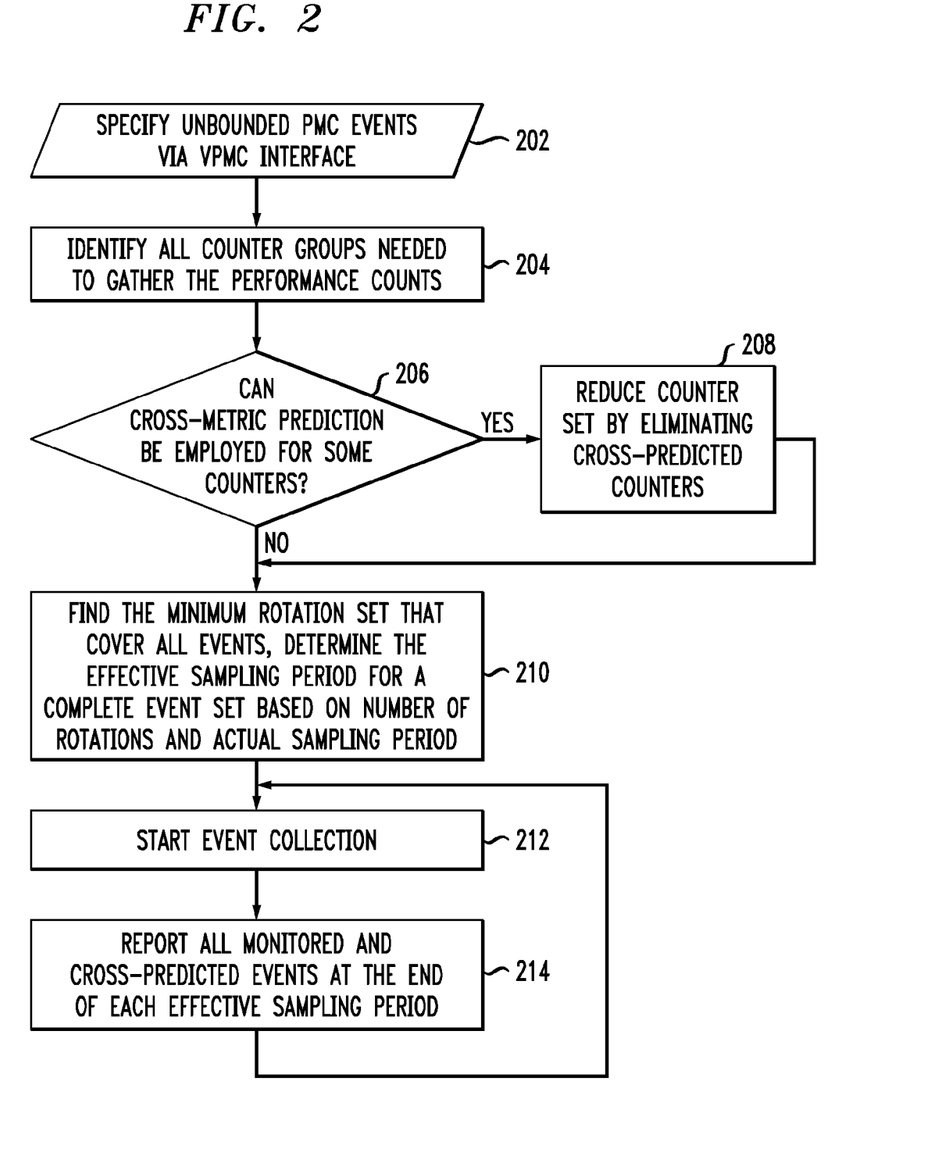
FIG. 2 is a flow diagram illustrating techniques for online monitoring, according to an embodiment of the invention.

FIG. 2 is a flow diagram illustrating techniques for online monitoring, according to an embodiment of the invention. In online monitoring, based on the unbounded set of counters chosen at the user level, VPMC identifies the minimum spanning set of counter groups that need to be monitored at the hardware layer. In early operating stages, VPMC employs runtime multiplexing to cover all the counter instances over specified time epochs. Furthermore, internally, as VPMC gathers information about monitored metrics, VPMC continuously trains a cross metric predictor module that aims to approximate counter measures for unmonitored metrics. The cross metric predictor module is a sub-component of the VPMC layer. Based on this, VPMC can also employ cross-metric predictions of unmonitored metrics. A notable methodology for online monitoring is determining the discriminant counter metrics that can predict the remaining unmonitored metrics with the highest accuracy.

As depicted in FIG. 2, the online operation of VPMC can include the following steps. Step 202 includes specifying the set of (unbounded) performance monitoring events that need to be monitored via the VPMC interface. Step 204 includes identifying the desired hardware performance counter groups needed to gather the performance counts, and that represent these events by either direct mapping to physical events or indirect mapping by facilitating cross-metric predictions. Also, step 206 includes determining whether cross-metric prediction can be employed for some counters. If yes, then the techniques continue to step 208, which includes reducing the counter set by eliminating cross-predicted counters. If no, then the techniques continue to step 210.

Step 210 includes finding the minimum spanning or rotation set of hardware monitor mode control register (MMCR) configurations to capture all of the proposed counter groups. MMCR register provides configuration of performance counters in IBM p-series microprocessors. One or more embodiments of the invention include using a configured and derived rotation granularity among counter groups, and based in the total required rotations, determining the reported event sampling granularity at the user level. Step 212 includes starting runtime performance monitoring and event collection, while iteratively reconfiguring MMCR to capture all specified counter groups. Further, at the end of each complete rotation, step 214 includes performing any necessary cross-metric predictions and reporting to the user level the following counter information n-tuple: {Derived sampling granularity, event(1) count, . . . , event(n) count}.

In offline monitoring, one differentiating factor is that the monitored statistics are delay tolerant. That is, the set of specified performance metrics can be reported at a later time. As such, VPMC can work in-concert with a user-level component, namely a VPMC agent. A VPMC agent wraps the application, or set of applications that need to be monitored, and based on the set of desired metrics, performs multiple profiling runs with different counter sets.

Figure 3:
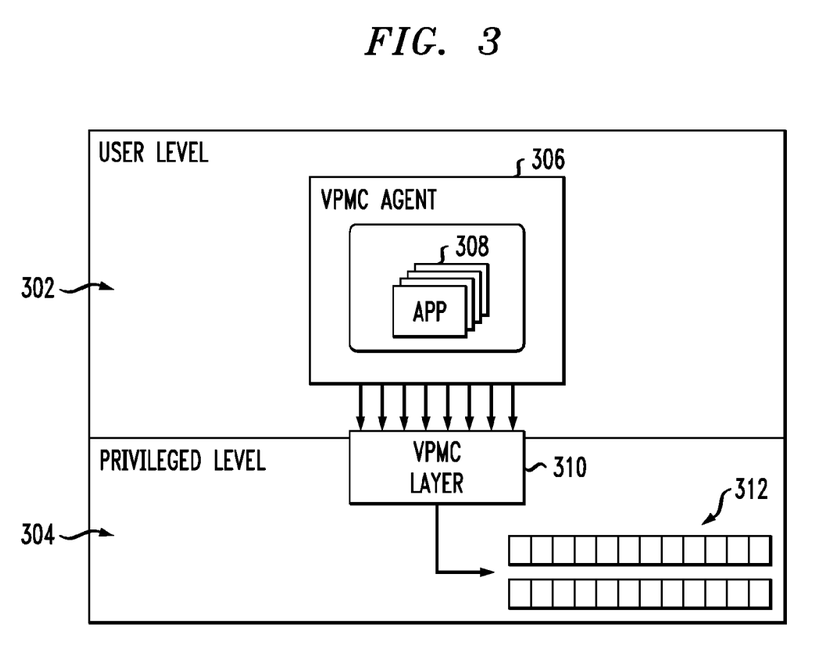
FIG. 3 is a diagram illustrating coordination of VPMC agent and VPMC for offline monitoring, according to an embodiment of the invention.

FIG. 3 is a diagram illustrating coordination of VPMC agent and VPMC for offline monitoring, according to an embodiment of the invention. By way of illustration, FIG. 3 depicts a user level 302, which includes a VPMC agent module 306, which further includes an application 308. FIG. 3 also depicts a privileged level 304, which includes a VPMC layer 310 and performance monitoring counters 312.

Figure 4:
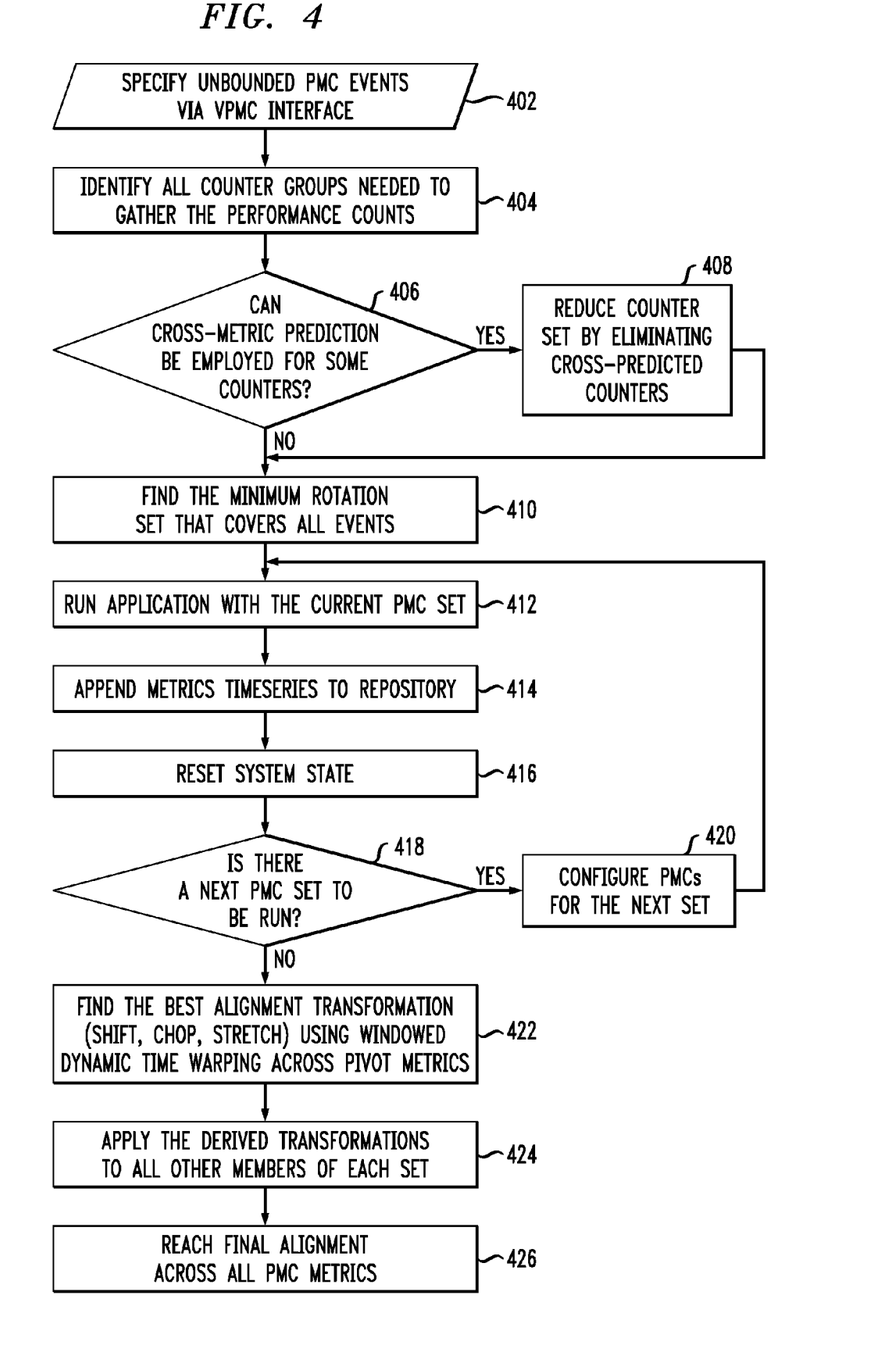
FIG. 4 is a flow diagram illustrating techniques for offline monitoring, according to an embodiment of the invention.

FIG. 4 is a flow diagram illustrating techniques for offline monitoring, according to an embodiment of the invention. Step 402 includes specifying unbounded PMC events via VPMC interface. Also, one or more embodiments of the invention include identifying a common pivot metric across performance counter groups. Note that in all microprocessor performance counter architectures, IPC is a commonly available pivot metric. For example, in POWER series, it is available in all performance counter groups. In recent Intel architectures, instructions retired is a fixed, pre-configured architectural performance counter. The purpose of these counters is to provide an architecturally consistent set of events that the performance analysis and dynamic adaptation schemes can rely on across implementations. By aligning traces with respect to these common metrics, one can collect and correlate performance monitoring information that can be spread across several different counter sets in different implementations.

Step 404 includes identifying all PMC groups needed to gather the performance counts and that best facilitate the end goals defined above by either direct mapping to physical events or indirect mapping by facilitating cross-metric predictions. Additionally, step 406 includes determining whether cross-metric prediction can be employed for some counters. If yes, then the techniques continue to step 408, which includes reducing the counter set by eliminating cross-prediction counters. If no, then the techniques continue to step 410.

Step 410 includes finding the minimum spanning or rotation set of MMCR configurations to capture all the proposed counter groups. Step 412, step 414, step 416, step 418 and step 420 include running the (entire) application iteratively by reconfiguring MMCR to capture other counter groups. As such, the following steps are performed for each configuration: Step 412: Run the application with current MMCR configuration (that is, the current PMC set); Step 414: Add the data to current performance counter measurement repository; Step 416: Reset system state; for example, flush the caches by running a memory intensive application; Step 418: Check to see if there is a next PMC set to run; Step 420: If there is a next PMC set to run, then reconfigure MMCR for the next performance counter group; and go back to step 412.

If there is not a next PMC set to run, then the techniques proceed to step 422. Step 422 includes finding the best alignment transformation (for example, align, shift, chop and stretch) using windowed dynamic time warping across the pivot metrics across all PMC group measurements. Further, step 424 includes applying the derived (same) transformations to all other members of the same group and to all other members of each set. Also, step 426 includes reaching a final aligned characterization including all PMC metrics.

The end result of offline monitoring is a complete timeline of the large set of monitored PMCs for a single hypothetical run. To achieve this, the VPMC can, for example, employ several methods in coordination in step 422. First, after the individual runs are complete, the VPMC can employ a windowed dynamic time warping (wDTW) method to align different traces. Then, the VPMC can employ glitch removal and low-pass filtering to clean out isolated bursts and spikes due to system effects. With the help of these, the VPMC layer can give the illusion of an unbounded set of PMCs visible to applications with synchronized measures for a single run.

As also detailed herein, one or more embodiments of the invention include online monitoring. By way of example, online monitoring with cross-metric prediction algorithm includes the following steps:
  Read the data for all of the groups.
  Pick the IPC in one of the groups as the reference, to which all of the remaining groups' IPCs (and hence the other metrics in the respective groups) will be aligned.
  Align all of the IPCs to the reference IPC.
  Via the IPC alignments, align the others metric data in each group with the reference IPCs.
  The above steps synchronize all of the possible metrics in various groups to single reference IPC metric.
  Given the synchronized metric sequences, one or more embodiments of the invention can include predicting any metric (for example, IPC) as a function of the remaining metrics. For example, an L1 cache rate from a different metric group (in relation to the reference IPC metric) can be used to predict the reference IPC metric.
  The prediction is performed using a number of machine learning techniques.
  In the model training/learning phase, one or more embodiments of the invention can include using all or a subset of the synchronized metrics as features. These features can be continuous (regression) or discrete (after quantization) (classification).

Similarly and as also detailed herein, an offline monitoring metric synchronization and alignment algorithm can include the following steps:
  Assume that the PMC metrics are shifted and distorted versions of each other.
  Select a frame size of between 100-300 samples, for example, 200 samples.
  Select a shifting window of 50-200 samples, for example, 100.
  Fix the frame of 200 sample in the reference IPC and search for the best matching frame within the following window: [current frame−/+100] by sliding the frame in the target IPC.
  The best match is described in terms of Euclidean Distance between the reference and target IPC frames, where the frame shift resulting to the smallest error is selected as the aligned target IPC frame.
  Update/increment the data pointers on both reference and target IPCs to start aligning the following frame.
  If the distance is higher than a preset threshold, ignore the current frame (no match) and move to the next frame.
  For each aligned IPC frame, extract/retrieve the corresponding frames for the other metrics in the group, and write the synchronized and combined metric frames in a new file along with their start/end time stamps for the reference and target IPC.

Stop once the end of reference and target IPC data is reached.

After finishing the pairwise IPC alignments between reference IPC and the IPCs from all the remaining groups, intersect the time stamps of the frames according to the reference IPC and keep the common samples across all groups.

This is the data used for cross-metric prediction.

Figure 5:
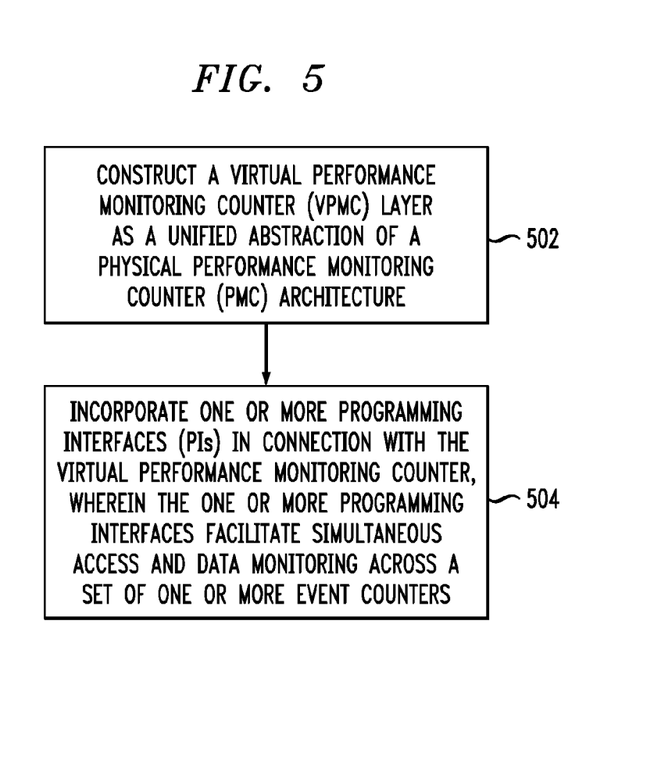
FIG. 5 is a flow diagram illustrating techniques for monitoring a set of one or more event counters of application execution, according to an embodiment of the invention.

FIG. 5 is a flow diagram illustrating techniques for monitoring a set of one or more event counters (also referred to herein as one or more performance-related metrics; for example, a set of specific metrics) of application execution (for example, in a microprocessor system), according to an embodiment of the present invention. Step 502 includes constructing a virtual performance monitoring counter (VPMC) layer as a unified abstraction of a physical performance monitoring counter (PMC) architecture. This step can be carried out, for example, using the modules and components depicted in FIG. 1 and/or FIG. 3. Also, the virtual performance monitoring counter layer can be implemented in one of software, firmware or programmable hardware.

Step 504 includes incorporating one or more programming interfaces (PIs) in connection with the virtual performance monitoring counter, wherein the one or more programming interfaces facilitate simultaneous access and (unambiguous) data monitoring across a set of one or more event counters (application, operating system and/or hypervisor). This step can be carried out, for example, using the modules and components depicted in FIG. 1 and/or FIG. 3.

Data monitoring across a set of one or more event counters can be carried out, for example, at a user or a software level. Also, as detailed herein, the virtual performance monitoring counter layer is capable of providing, via the programming interfaces, a monolithic view of a set of event counters that exceeds a number of simultaneously readable physical counters in underlying machine hardware. Providing a monolithic view of a set of event counters can include using multiple runs of an application across one or more groups of monitored physical counters, and consolidating the groups of monitored physical counters into a single, unified view of monitored data requested for one or more events specified by the application (or other supervising software).

Additionally, the virtual performance monitoring counter layer provides automatic alignment of monitored counter data across multiple runs to present, via the programming interfaces, a unified (and coherent or unambiguous) view of one or more desired event statistics.

Further, in one or more embodiments of the invention, data monitoring across a set of one or more event counters includes online processing. Online processing includes specifying the set of one or more (unbounded) performance monitoring events to be monitored via a virtual performance monitoring counter interface, identifying one or more hardware performance counter groups needed to gather performance event statistics, reducing the number of counter groups by eliminating any counter group for which cross-metric prediction can be employed, determining a minimum rotation set across the counter groups that cover all the specified performance monitoring events, and conducting a set of iterative, sequential runs (equal to the determined minimum rotation set) of an application to collect physical counter data to report data for the specified performance monitoring events. Online processing can additionally include performing any necessary cross-metric prediction-based augmentation of data prior to reporting of event data.

Also, in one or more embodiments of the invention, data monitoring across a set of one or more event counters includes offline processing. Offline processing can include specifying the set of one or more (unbounded) performance monitoring events to be monitored via a virtual performance monitoring counter interface, identifying one or more hardware performance counter groups needed to gather performance event statistics, reducing the number of counter groups by eliminating any counter group for which cross-metric prediction can be employed, determining a minimum rotation set across the counter groups that cover all the specified performance monitoring events, and conducting a set of iterative runs (equal to the determined minimum rotation set) of an application to capture other counter groups.

As described herein, conducting a set of iterative runs of an application to capture other counter groups can include running the application with current set of performance counter groups, adding data from the run with current set of performance counter groups to a current performance counter measurement repository, flushing the caches, and reconfiguring for a next performance counter group. Offline processing can also include determining an alignment transformation using windowed dynamic time warping across all performance counter group measurements.

One or more embodiments of the invention can additionally include applying the determined alignment transformation to each member of each performance counter group. Determining an alignment transformation using windowed dynamic time warping across all performance counter group measurements can include reading each performance counter metric view that are shifted and distorted versions of each other, selecting a frame size parameter (typically between 100 and 300 samples) and a shifting window parameter (typically between 50 and 200 samples), and fixing the frame size in a reference instructions completed per cycle (IPC) and search for a best matching frame within a chosen window by sliding the frame in a target IPC, wherein the best matching frame is described in terms of Euclidean distance between the reference and target IPC frames, wherein a frame shift resulting in a smallest error is selected as aligned target IPC frame. Determining an alignment transformation further includes updating one or more data pointers on the reference and target IPCs to start aligning a following frame, ignoring a current frame and moving to a next frame if the Euclidean distance is higher than a preset threshold, and, for each aligned IPC frame, extracting one or more corresponding frames for one or more other metrics in the group, and writing each synchronized and combined metric frame in a new file along with a start and end time stamp for the reference and target IPC. Further, determining an alignment transformation includes stopping once an end of reference and target IPC data is reached. Additionally, one or more embodiments of the invention include, after completing pairwise IPC alignments between the reference IPC and each IPC from each remaining group, intersecting time stamps of the frames according to the reference IPC and keeping common samples across all groups.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include the modules and components depicted in FIG. 1 and/or FIG. 3 (such as, for example, a virtual performance monitoring counter (VPMC) layer module, a VPMC agent module, a programming interface module, a performance monitoring counter module and a cross metric predictor module executing on a hardware processor). Such modules can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
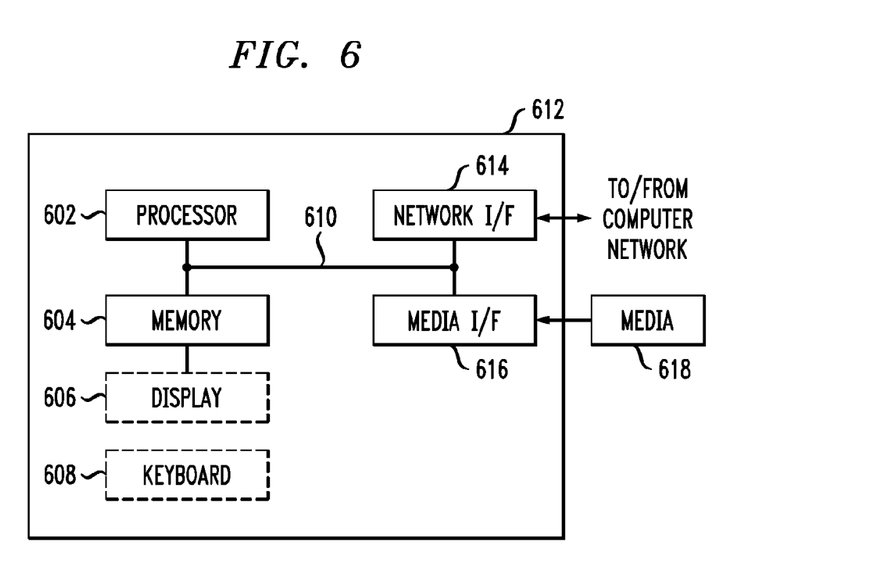
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1 and FIG. 3. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing a unified abstraction layer that monitors multiple events in a VPMC environment.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for monitoring a set of one or more event counters of application execution, wherein the method comprises:
   constructing a virtual performance monitoring counter (VPMC) layer as a unified abstraction of a physical performance monitoring counter (PMC) architecture; and
   incorporating one or more programming interfaces (PIs) in connection with the virtual performance monitoring counter, wherein the one or more programming interfaces facilitate simultaneous access and data monitoring across a set of one or more event counters, and wherein the virtual performance monitoring counter layer is capable of providing, via the one or more programming interfaces, a monolithic view of a set of one or more event counters that exceeds a number of simultaneously readable physical counters in underlying machine hardware;
   wherein at least one of said constructing and said incorporating is carried out by a computing device.

2. The method of claim 1, wherein data monitoring across a set of one or more event counters comprises data monitoring across a set of one or more event counters at a user or a software level.

3. The method of claim 1, wherein the virtual performance monitoring counter layer is implemented in one of software, firmware or programmable hardware.

4. The method of claim 1, wherein providing a monolithic view of a set of one or more event counters comprises:
   using multiple runs of an application across one or more groups of monitored physical counters; and
   consolidating the one or more groups of monitored physical counters into a single, unified view of monitored data requested for one or more events specified by the application.

5. The method of claim 1, wherein the virtual performance monitoring counter layer provides automatic alignment of monitored counter data across multiple runs to present, via the one or more programming interfaces, a unified view of one or more desired event statistics.

6. The method of claim 1, wherein data monitoring across a set of one or more event counters comprises online processing.

7. The method of claim 6, wherein online processing comprises:
   specifying the set of one or more performance monitoring events to be monitored via a virtual performance monitoring counter interface;
   identifying one or more hardware performance counter groups needed to gather performance event statistics;
   reducing the number of counter groups by eliminating any counter group for which cross-metric prediction can be employed;
   determining a minimum rotation set across the one or more counter groups that cover all the specified performance monitoring events; and
   conducting a set of iterative, sequential runs of an application to collect physical counter data to report data for the specified performance monitoring events.

8. The method of claim 7, further comprising performing cross-metric prediction-based augmentation of data prior to reporting of event data.

9. The method of claim 1, wherein data monitoring across a set of one or more event counters comprises offline processing.

10. The method of claim 9, wherein offline processing comprises:
    specifying the set of one or more performance monitoring events to be monitored via a virtual performance monitoring counter interface;
    identifying one or more hardware performance counter groups needed to gather performance event statistics;
    reducing the number of counter groups by eliminating any counter group for which cross-metric prediction can be employed;
    determining a minimum rotation set across the one or more counter groups that cover all the specified performance monitoring events; and
    conducting a set of iterative runs of an application to capture one or more other counter groups.

11. The method of claim 10, wherein conducting a set of iterative runs of an application to capture one or more other counter groups comprises:
    running the application with current set of performance counter groups;
    adding data from the run with current set of performance counter groups to a current performance counter measurement repository;
    flushing the caches; and
    reconfiguring for a next performance counter group.

12. The method of claim 10, further comprising determining an alignment transformation using windowed dynamic time warping across all performance counter group measurements.

13. The method of claim 12, further comprising applying the determined alignment transformation to each member of each performance counter group.

14. The method of claim 12, wherein determining an alignment transformation using windowed dynamic time warping across all performance counter group measurements comprises:
    reading each performance counter metric view that are shifted and distorted versions of each other;
    selecting a frame size parameter and a shifting window parameter;
    fixing the frame size in a reference instructions completed per cycle (IPC) and search for a best matching frame within a chosen window by sliding the frame in a target IPC, wherein the best matching frame is described in terms of Euclidean distance between the reference and target IPC frames, wherein a frame shift resulting in a smallest error is selected as aligned target IPC frame;
    updating one or more data pointers on the reference and target IPCs to start aligning a following frame;
    ignoring a current frame and moving to a next frame if the Euclidean distance is higher than a preset threshold;

for each aligned IPC frame, extracting one or more corresponding frames for one or more other metrics in the group, and writing each synchronized and combined metric frame in a new file along with a start and end time stamp for the reference and target IPC;

stopping once an end of reference and target IPC data is reached; and after completing pairwise IPC alignments between the reference IPC and each IPC from each remaining group, intersecting time stamps of the frames according to the reference IPC and keeping common samples across all groups.

15. The method of claim 1, further comprising providing a system, wherein the system comprises one or more distinct software modules, each of the one or more distinct software modules being embodied on a tangible computer-readable recordable storage medium, and wherein the one or more distinct software modules comprise a virtual performance monitoring counter (VPMC) layer module, a VPMC agent module, a programming interface module, a performance monitoring counter module and a cross metric predictor module executing on a hardware processor.

16. A computer program product comprising a tangible computer readable recordable storage memory device including computer useable program code for monitoring a set of one or more event counters of application execution, the computer program product including:

computer useable program code for constructing a virtual performance monitoring counter (VPMC) layer as a unified abstraction of a physical performance monitoring counter (PMC) architecture; and computer useable program code for incorporating one or more programming interfaces (PIs) in connection with the virtual performance monitoring counter, wherein the one or more programming interfaces facilitate simultaneous access and data monitoring across a set of one or more event counters, and wherein the virtual performance monitoring counter layer is capable of providing, via the one or more programming interfaces, a monolithic view of a set of one or more event counters that exceeds a number of simultaneously readable physical counters in underlying machine hardware.

17. The computer program product of claim 16, wherein data monitoring across a set of one or more event counters comprises at least one of online processing and offline processing.

18. A system for monitoring a set of one or more event counters of application execution, comprising:

a memory; and at least one processor coupled to the memory and operative to:

construct a virtual performance monitoring counter (VPMC) layer as a unified abstraction of a physical performance monitoring counter (PMC) architecture; and incorporate one or more programming interfaces (PIs) in connection with the virtual performance monitoring counter, wherein the one or more programming interfaces facilitate simultaneous access and data monitoring across a set of one or more event counters, and wherein the virtual performance monitoring counter layer is capable of providing, via the one or more programming interfaces, a monolithic view of a set of one or more event counters that exceeds a number of simultaneously readable physical counters in underlying machine hardware.

19. The system of claim 18, wherein data monitoring across a set of one or more event counters comprises at least one of online processing and offline processing.

* * * * *